(No Model.) 4 Sheets—Sheet 1.

C. M. SYMONDS.
CAN BODY MAKING MACHINE.

No. 515,136. Patented Feb. 20, 1894.

Witnesses:

Inventor,
Clarence M. Symonds
By Dewey & Co.
Attys (No Model.) 4 Sheets—Sheet 2.
C. M. SYMONDS.
CAN BODY MAKING MACHINE.

No. 515,136. Patented Feb. 20, 1894.

(No Model.) 4 Sheets—Sheet 3.

C. M. SYMONDS.
CAN BODY MAKING MACHINE.

No. 515,136. Patented Feb. 20, 1894.

Witnesses,

Inventor,
Clarence M. Symonds
By Dewey & Co.
Attys (No Model.) 4 Sheets—Sheet 4.
C. M. SYMONDS.
CAN BODY MAKING MACHINE.
No. 515,136. Patented Feb. 20, 1894.
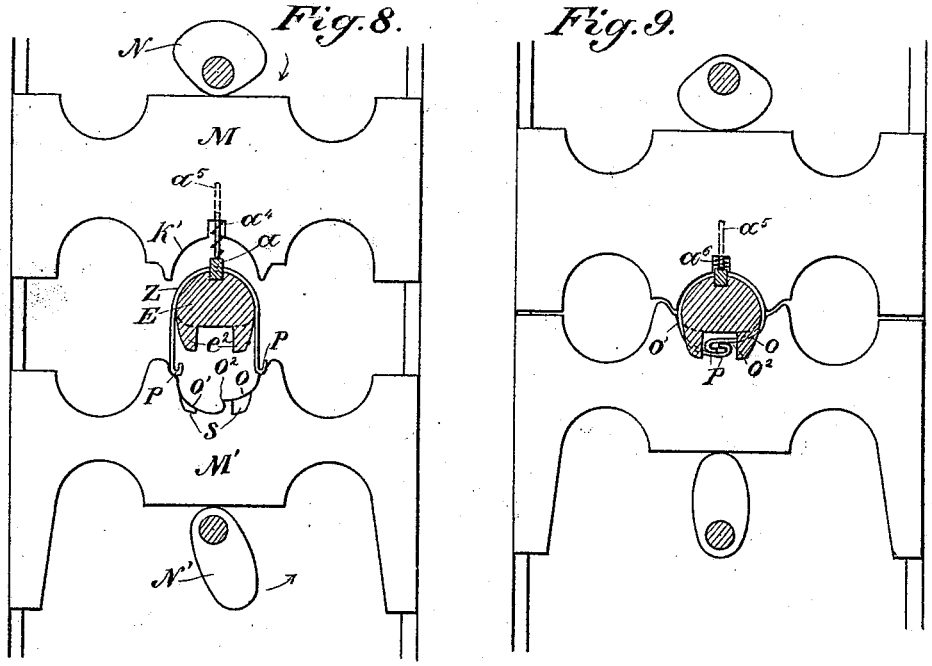
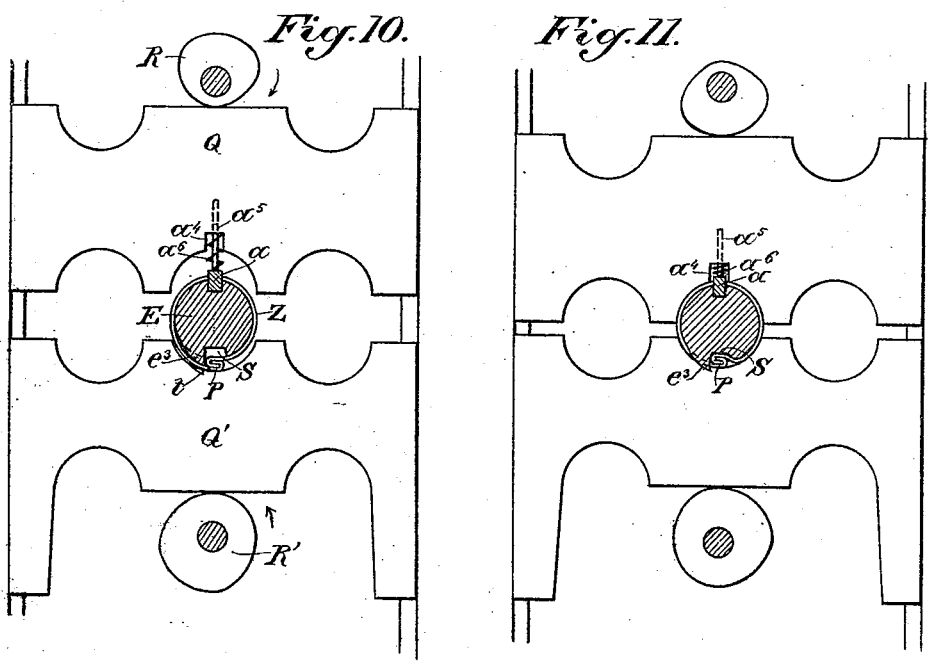
Witnesses:
Inventor,
Clarence M. Symonds
By Dewey & Co.
attys

UNITED STATES PATENT OFFICE.

CLARENCE M. SYMONDS, OF SAN FRANCISCO, CALIFORNIA.

CAN-BODY-MAKING MACHINE.

SPECIFICATION forming part of Letters Patent No. 515,136, dated February 20, 1894.

Application filed June 5, 1893. Serial No. 476,652. (No model.)

*To all whom it may concern:*

Be it known that I, CLARENCE M. SYMONDS, a citizen of the United States, residing in the city and county of San Francisco, State of California, have invented an Improvement in Can-Body-Making Machines; and I hereby declare the following to be a full, clear, and exact description of the same.

My invention relates to a machine for making can bodies.

It consists in certain details of construction which will be more fully explained by reference to the accompanying drawings, in which—

Figure 1:
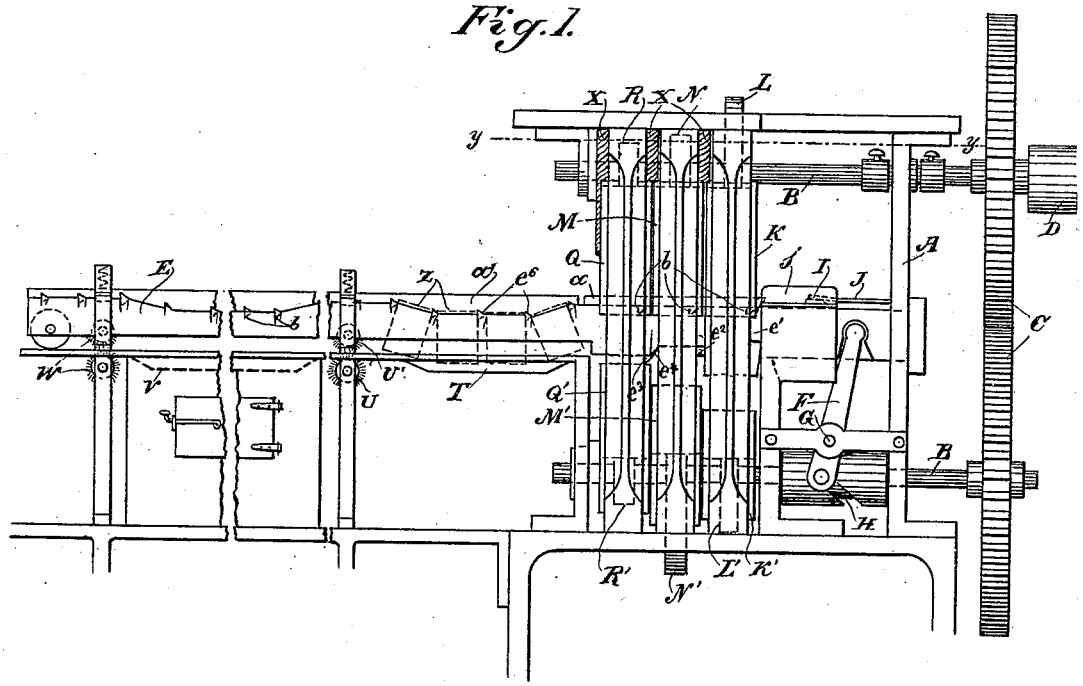
Figure 2:
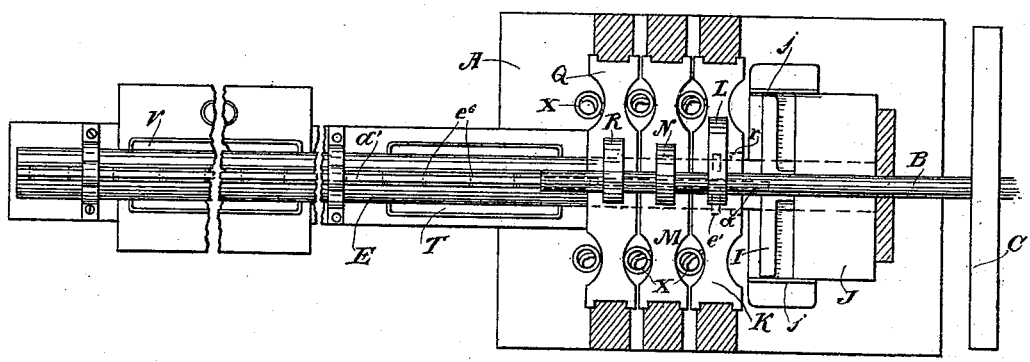
Figure 3:
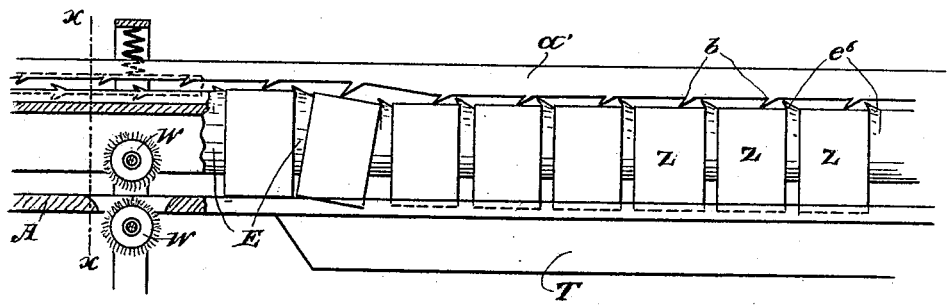
Figure 12:
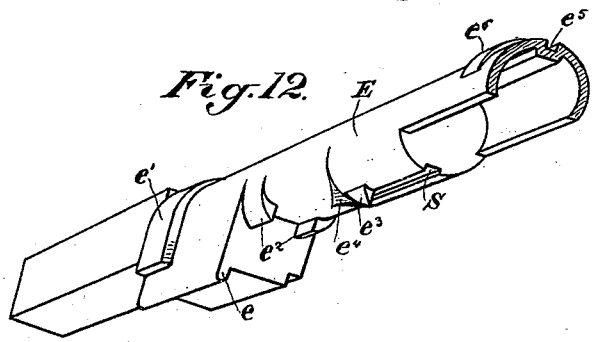
Figure 4:
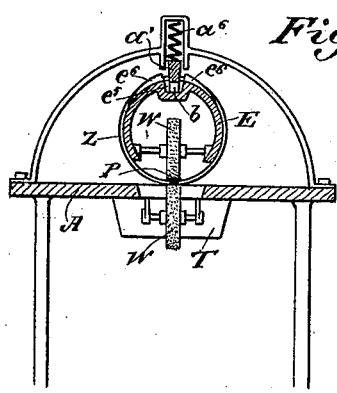
Figure 1:
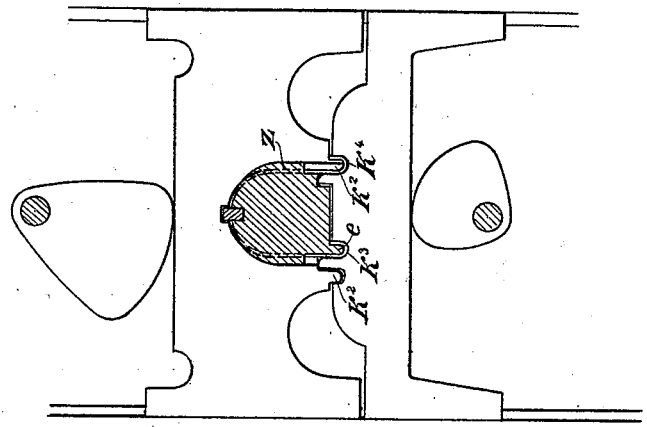

Figure 1 is a side elevation showing my apparatus. Fig. 2 is a plan, and horizontal section of the upper part of the frame with the horn in its forward movement. Fig. 3 is an enlarged view and partial section of part of the horn on its forward movement and parts near the acid tank. Fig. 4 is an enlarged transverse section showing the wipers. Figs. 5 to 11 inclusive are transverse sections of the horn with the various jaws and actuating cams, the horn being retracted and the tin in front of the gages. Fig. 12 is a perspective view of the horn and carriers viewed from below.

A is a frame upon which the apparatus is carried.

B B are horizontal shafts journaled longitudinally upon the frame and carrying cams by which the mechanism is actuated.

C C are gear wheels fixed upon the shafts and engaging with each other so that the two shafts are rotated in unison.

D is a pulley which represents any means for applying power to rotate the shafts and operate the mechanisms.

E is a cylindrical horn which slides horizontally in suitable supports upon the apparatus, and is reciprocated intermittently by means of a lever arm F fulcrumed at G, so that one end engages a slot in the horn, and the other end engages a groove in the cam H upon the lower shaft B. By the action of this cam, the horn is reciprocated periodically, and by means of suitable carriers or projections $e'$, $e^2$, $e^3$ upon the horn, the sheet of metal from which the can body is to be formed is gradually advanced to each stage of its formation. It will be manifest that the horn may remain stationary and that independently reciprocating carriers can be employed to advance the sheet over the stationary horn, the other parts operating in conjunction with the horn in the same manner as they do in the present case.

In the present illustration of my apparatus, I is a carrier fixed to the horn and reciprocating with it.

Figure 6:
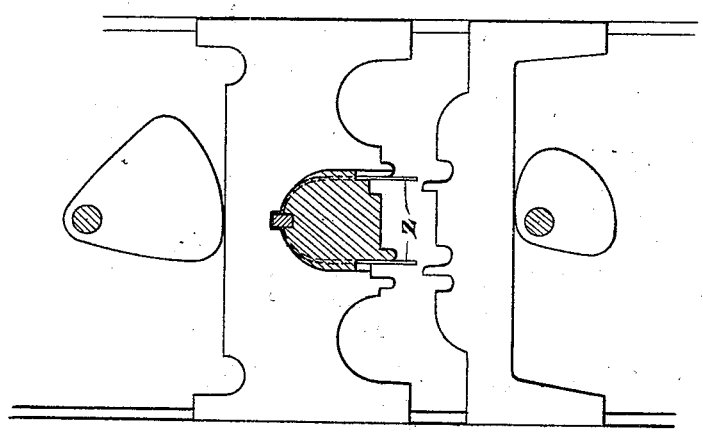
Figure 5:
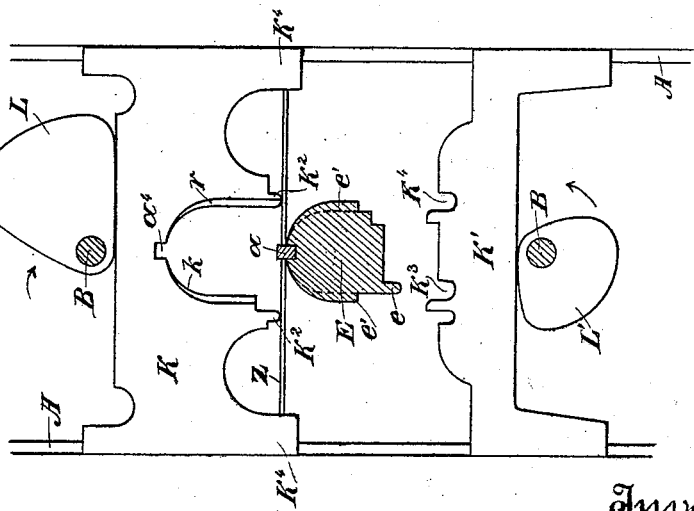

J is a table upon which the sheet of metal cut to the proper size is placed, or fed by mechanism, if preferred, so as to lie in front of the carrier when the latter is retracted beneath the table. Pieces $j$ upon each side insure the sheets being placed in line with the extensions $k^4$ of the jaws K. When the horn and carrier advance, they force the sheet of metal above the horn and into line with the first of the vertically reciprocating forming jaws K and K', and between projecting, guiding extensions $k^4$. $a$ is a bar extending horizontally in a groove or channel $e^5$ in the horn, and having projections $b$ which engage the sheets of metal (or the cans when formed) and as the horn is retracted after a forward movement, they prevent the sheets or cans from moving backward with the horn. That part of the horn which is presented between the jaws K K' after the horn has been retracted, is made with curved top and straight sides, and the bottom is flat, with a projection $e$ upon one side. The upper jaws are slotted at $a^4$ to form a guide to keep the bar $a$ in place when it lifts out of the horn, and to allow the jaws to come down upon the horn. Holes are made in the jaws M and Q, and pins $a^5$ extend from the bar $a$ into the holes to prevent end movement. Spiral springs $a^6$ surround the pins and press upon the bar to hold it down so that the projections $b$ will engage the sheet and hold it after it has been advanced. The uppermost of the jaws K is reciprocated by means of a cam L upon the upper shaft B, and the lower jaw K' is correspondingly reciprocated by cam L' upon the lower driving shaft. The lower part of the upper jaw K has a curved channel $k$ formed in it which corresponds in shape with the top of the horn, and lugs $K^2$ project downwardly upon each side of this channel. The channel $k$ in the upper jaw is sufficiently larger than the horn around which it fits, to allow the sheet of metal to slip between the two, so that if the ends are not exactly even when they make contact with the lower jaw, the sheet will be pushed around the horn until the ends are even. These lugs K² engage the sheet of metal where it projects upon each side of the horn, and bend it down over the horn so that the ends of the metal extend below the lower surface of the horn, as shown in Fig. 6. In the top of the lower jaw K' are made rounded slots K³ and K⁴, and when this jaw rises to meet the descending upper jaw, the edges of the sheet of metal are bent by the action of the slots K³ and K⁴, so as to be given a curvature similar to that shown in Fig. 7 where the jaws are shown as being closed together. The lug $e$ upon the horn, and the lug K² on the upper jaw K, enter the channels K³ and K⁴, and thus cause the edges of the tin to continue upward tangential to the curves, and prevent their curling inwardly.

The construction of the actuating cams is such that the lower jaw K' remains in position, while the upper jaw K is withdrawn, and the rounded slots K³, K⁴ prevent the edges of the tin which remain in the slots from springing apart, while it is being advanced to the next set of jaws M M' which lie in close proximity to the jaws K and K'. When the jaw K has moved up, the sheet of metal is in front of the carriers $e'$ upon the horn, and it is moved forward to the jaws M M' by the advancing of the horn, and prevented from being retracted with the horn, by the next projection $b$ upon the bar $a$. When the horn is retracted, the part brought between the jaws M M' is cut away at the bottom, to allow the edges of the sheet to be interlocked beneath it. These jaws are reciprocated at the proper time by cams N and N' fixed upon the shafts B B, and the meeting surfaces of the jaws are formed as follows: The lower surface of the upper jaw M has a channel $k'$ which is semi-cylindrical in form and not as deep as the channel shown in the jaw K. The upper surface of the lower jaw M' has curved recesses formed in sections O and O', the curve O' being made deeper than O, and the two meet in a projecting point O² beneath the center of the horn. The sheet of metal now curves over the horn which is cut away on its lower surface at this point, with its lower ends having the upturned hooks P, one being turned inwardly and the other outwardly as shown, and as the two jaws come together, the upper one first clamps the sheet upon the top of the horn, and these hooks are forced toward each other by the curvatures O and O' as the lower jaw rises after the upper one has come down, the inwardly turning hook fitting into the deeper recess beneath the point O², while the outwardly turned hook slides over the point, following the curvature O until it has passed beyond the inwardly turned hook, when the elasticity of the metal causes it to drop over the point of the inwardly turned hook and engage it after the lower jaw recedes as shown in Fig. 9. The jaws M and M' then separate by the continued movement of their actuating cams, and the sheet of metal closed into a cylindrical form with the edges hooked together now lies in front of the carriers $e^2$, and is again moved forward by the advancement of the horn to the next pair of jaws Q and Q' which are actuated by cams R and R' upon the shafts B B. At this point it is retained by another projection $b$ on the bar $a$. The horn being retracted brings the anvil portion of it between the jaws Q Q'. This part of the horn is formed with a depressed channel S which corresponds in position with the seam or union of the sheet of metal. The horn is beveled at this point as shown at $e^4$. The upper jaws M and Q are moved to clamp the sheet against the horn before the lower jaws are moved up. The upper jaw Q has a segmental channel formed in its lower surface, and the lower jaw Q' has a corresponding segmental channel which when the jaws are carried toward each other by the action of their cams, forces the joint formed by the engaging of the hooks in the edges of the sheet of metal, into the depressions S, and closes it firmly together, as shown in Fig. 11.

The carriers $e'$ by which the sheet is moved between the first set of jaws K K' are made to project on each side of the horn as shown in Fig. 12. The jaw K has recesses $r$ made deep enough on the side toward which the sheet approaches, so that when it approaches the horn to bend the sheet around the latter, these deeper parts of the channels will inclose the carriers. The front edges of the carriers are beveled or inclined so that as they are inclosed by the approaching jaw, if the sheet does not stand exactly square, the edges will be brought into the proper position by the incline of the carrier edges, down which the edges of the sheet slip as the jaw closes around it. The second set of carriers $e^2$ project from the sides of the horn below the center as shown in Fig. 12, so that when the horn is retracted, they will pass between the vertical sides of the sheet which has been bent into the form shown in Fig. 8.

The sides of the lower jaws M' toward which the sheet is approached, are cut away so that after the sheet has been carried between the jaws M M' and the lower jaw moves up, the carriers will be inclosed in these recesses $s$ behind the edges of the sheet. The carrier $e^3$ is now transferred to the lower part of the horn, and shaped as shown in Fig. 12, so that when the interlocking edges of the sheet have been clasped together below the horn, but do not fit it closely, as shown in Fig. 10, this carrier may be drawn back through this space as the horn is retracted.

The carrier $e^3$ has its end beveled so that it strikes the edge of the seam, as it returns, and thus brings the seam exactly in line with the slot in the horn, into which it is compressed. The can is now completed and ready for soldering.

The jaw Q' has a recess $t$ to receive the carrier $e^3$ when the jaw closes up against the horn. As soon as the jaws Q and Q' are separated, the can is again moved forward, and passing along the horn the seam is allowed to drop into an acid tank T which prepares it for the solder. The carriers $e^6$ are now placed in pairs on each side of the slot $e^5$ of the horn, and are shaped like the projections $b$ on bar $a'$. The upper part of the horn at this point is so shaped that the can as it arrives at the edge of the acid tank tilts downward by reason of the reciprocations of the horn and the action of the bar $a'$, and the front end dips into the acid. A further movement carries it along in its tilted portion until the horn recedes when the can drops into a horizontal position with the seam traveling within the acid as far as desired, and a still further movement lifts the front end out of the acid, thus allowing any surplus acid to drip off the rear end, and the whole can is finally lifted out of the acid tank. The bottom of the horn is cut away above the acid tank and solder bath, to keep it out of them where the upper part of the horn is depressed. A further movement carries the can to the point where the outside of the seam passes over a wiper U which clears off any surplus acid, and when the horn is retracted it draws the wiper U' over the inner part of the seam, the can being held by a lug $b$ on the bar $a'$. By the next advance of the horn the can is moved on until the seam is dipped into the solder bath V in the same manner as described for its passage through the acid tank. The horn is made hollow beyond the last set of jaws, and the inside wipers are placed in the bottom of the horn. The bar $a'$ being forced down by its springs $a^6$, after a can has passed the projections $b$, will rest upon the cans and hold them steady as they pass through the acid and solder. This bar $a'$, exterior to the jaws, is preferably made separate from the bar $a$ which acts upon the cans while they are passing between the jaws. It also acts with the horn to tilt the cans in the acid tank and the solder bath. After lifting out of the solder bath, it passes between the wipers W, in the same manner as described for the acid wipers, and any surplus solder is wiped off, the can being then delivered from the outer end of the horn with the seam completed.

The vertically moving jaws by which the can was formed may either be retracted when relieved from the pressure of their cams by springs X or weights, or they may be actuated by positive movement by connection with the cams themselves.

While I have described the reciprocating horn and carriers by which the sheet is intermittently advanced between the various forming jaws, it will be manifest that the horn shaped in the same manner might be stationary, and external carriers employed to advance the sheet to its various points, the action of the forming jaws being the same in either case.

Having thus described my invention, what I claim as new, and desire to secure by Letters Patent, is—

1. In a can body forming machine, the reciprocating horn, the jaws movable to and from the horn from opposite sides at right angles with its line of reciprocation for forming the interlocking hooks, and other jaws for clasping together the hooks formed by the first named jaws.

2. In combination, a reciprocating horn, and the jaws K and K' movable to and from the horn from opposite sides at right angles with its line of movement, said jaws K' having rounded slots $K^3$ and $K^4$, whereby the edges of the sheet metal are bent to form interlocking hooks.

3. In combination with a reciprocating horn and means for clamping the sheets upon its top, the oppositely moving hook forming jaws, and the jaw M' for locking together the previously formed hooks.

4. In a can body forming machine, the reciprocating horn with carriers by which the sheet is advanced, and jaws adapted to approach the horn from opposite sides to bend the sheet after it has been advanced between them, the jaws having recesses formed near one edge into which the carriers are received when the jaws close about the horn, substantially as described.

5. In a can body forming machine, jaws movable to and from each other and at right angles with a horn which reciprocates between them, recesses formed in the edge of the jaw toward which the material is advanced, carriers fixed to the horn to advance the sheet, and corresponding in position with the recesses, said carriers having their front edges beveled so that in conjunction with the interior angles of the recesses in the jaw they serve to guide the sheet into the proper position before shaping, substantially as herein described.

6. In a can body forming machine, a reciprocating horn, jaws movable to and from it from opposite sides at right angles with its line of reciprocation, a table with gages between which the sheet is placed, and from which it is moved forward by carriers upon the horn, guides upon one of the jaws between which the sheet is received to be bent by the closing of the jaws, and means for adjusting the sheet to bend evenly around the horn, substantially as herein described.

7. In a can body forming machine, a reciprocating horn with carriers fixed thereto, forming jaws movable to and from the horn to shape the cans from sheets which are advanced intermittently by the carriers, and a stationary bar extending longitudinally with relation to the horn and having projections which engage the can bodies and prevent a backward movement when the horn is retracted, substantially as herein described.

8. In a can body forming machine, a reciprocating horn, and carriers by which the sheets to be formed are advanced, jaws movable transversely to and from the horn to bend the sheet around it, the upper jaw K having a channel, the curvature of which approximates to the shape of the horn, and of larger diameter, to allow the sheet to adjust itself around the horn and even the ends after bending, substantially as herein described.

9. In a can body forming machine, a reciprocating horn with carriers fixed thereto, jaws movable to and from the horn to bend the sheets and form the cans, a bar extending longitudinally with the horn having projections which act as stops to prevent the cans from being extracted with the horn, slots in the upper jaw into which the bar rises as the cans pass the projections, and springs by which it is depressed after a can has passed, substantially as herein described.

10. In a can body forming machine, a reciprocating horn and carriers, bending and forming jaws, and a longitudinal stop bar with projections, springs connected with the upper jaw, and acting to depress the bar, and pins on the bar entering holes in the jaw to prevent longitudinal motion, substantially as herein described.

11. In a can body forming machine, a reciprocating horn and carriers by which sheets are advanced, forming jaws movable to and from the horn to bend the sheets and form interlocking hooks upon their edges, cams by which the jaws are moved, so disposed that the lower jaw remains elevated after the upper jaw has been retracted, and serve to hold the edges of the sheet and prevent their springing apart and moving around the horn while the sheet is being advanced to the next pair of jaws, substantially as herein described.

12. In a can body forming machine, a reciprocating horn, jaws between which it passes, movable to and from the horn to bend the sheets and form the cans, carriers fixed to the horn and so disposed with relation to the jaws that they may be withdrawn through the interior of the can when the horn is retracted, substantially as herein described.

13. In a can body forming machine, a reciprocating horn and carriers attached thereto, a stop bar with projections to prevent the return of the cans when the horn is retracted, jaws between which the horn reciprocates and by which the sheets are interlocked, the cans formed and the seam compressed, cams by which the jaws are moved, so disposed that the upper jaws are depressed to clamp the sheet upon the top of the horn before the lower jaws rise to cause the edges of the sheet to interlock, and also before the seam is compressed, substantially as herein described.

14. In a can body forming machine, a reciprocating horn with carriers to advance the sheets and cans, jaws between which the horn passes and mechanism by which they are moved to and from the horn, said horn having its lower surface cut away at a point where the edges of the sheets are closed to interlock, substantially as herein described.

15. In a can body making machine, a reciprocating horn about which the cans are formed, carriers fixed to the horn by which the cans are advanced, an acid tank and a solder bath through which the cans are carried, stationary wipers against which the exterior of the seam moves when the can body is advanced, and wipers fixed to the horn, so as to be drawn over the interior of the seam when the horn is retracted, substantially as herein described.

16. In a can body making machine, a reciprocating horn and carriers by which the can body is advanced through an acid tank and solder bath respectively, and a spring actuated bar which is raised to allow the cans to pass and is pressed down upon them to hold them while within the tank and bath, and while the inside is being wiped, substantially as herein described.

17. In a can body making machine, mechanism by which metal sheets are bent into a cylindrical form and their edges united to form a closed seam, and a longitudinally reciprocating horn, about which the bodies are formed, with carriers and stops connected therewith, whereby the can bodies are advanced along the horn by the reciprocation thereof, substantially as herein described.

18. In a can body forming machine, with forming jaws, and a longitudinally reciprocating horn, the carrier $e^3$ having its end inclined and adapted to adjust and guide the seam in position to be closed and compressed, substantially as described.

19. In a can body forming machine, a horn, jaws adapted to move transversely to and from the horn, shafts and cams by which they are actuated, a channel formed in one of the jaws fitting the corresponding curvature of the horn, projections upon each side of the channel which engage the sheet of metal after the latter is delivered upon the horn below said jaw, whereby the sheet is bent around the upper part of the horn by the movement of the jaw, a lug $e$ projecting from the lower flat side of the horn and a lug $K^2$ on the lower side of the upper jaw, and grooves formed in the lower jaw which engage the lower edges of the sheet of metal after it has been bent about the horn by the upper jaw whereby the edges are bent to form the interlocking hooks of the seam, substantially as herein described.

20. In a can body forming machine, a reciprocating horn, carriers by which the sheet of metal is advanced intermittently along the top of the horn, shafts situated above and below the horn and parallel thereto and a mechanism by which the shafts are rotated in unison, reciprocating jaws on opposite sides of the horn adapted to approach to and recede from the horn in planes transversely of its line of movement, and cams by which they are actuated, grooves and channels by which the sheet is first bent over the horn and the interlocking edges afterward turned upon the lower edges of the sheet, substantially as herein described.

21. In a can body forming machine, jaws by which the sheets are bent and their edges bent to form interlocking hooks, a second set of reciprocating jaws transverse to the horn, carriers by which the partially bent sheet is advanced from the first to the second set of jaws, a semi-circular channel formed in the upper of these jaws, and curved recesses O and O' formed in the lower jaw, meeting in the projecting point $O^2$ whereby the movement of these jaws closes the lower edges of the sheet of metal and causes the hooks thereon to interlock, substantially as herein described.

22. In a can body forming machine, a reciprocating horn, carriers by which the sheet of metal is advanced intermittently along the horn, cam actuated jaws on opposite sides of the horn by which the sheet is first bent around the upper part of the horn and interlocking hooks formed upon its lower projecting edges, said jaws movable in planes at right angles with the line of movement of the horn, a second pair of reciprocating jaws whereby said hooks are caused to interlock with each other, a third set of jaws between which the partially formed body is advanced by the carriers, and by which the seam is closed and compressed ready for soldering, substantially as herein described.

23. In a can body forming machine, the parallel shafts with mechanism whereby they are caused to rotate in unison, cams fixed upon said shafts, and oppositely moving forming jaws which are reciprocated by the action of the cams, a horn about which the can body is formed mounted to slide between the jaws which are actuated by the cams upon the shafts, a mechanism by which said horn is reciprocated longitudinally and carriers fixed thereon by which the sheet of metal and the partially formed cans are advanced intermittently from one part of the forming mechanism to the next succeeding, substantially as herein described.

24. In a can body forming machine, a reciprocating horn, carriers attached thereto, mechanism by which the horn is reciprocated and sheets of metal are advanced intermittently along the horn, forming jaws between which the horn passes, and mechanism by which the jaws are reciprocated transversely to and from the horn, whereby the sheet of metal presented between the jaws is bent, the interlocking hooks formed and the seams united and closed, an acid tank above which the horn reciprocates beyond the seam closing jaws, and a solder bath situated beyond the acid tank, carriers upon the horn by which the can body is advanced through the acid tank and the solder bath successively and wipers between which the seam passes after leaving the acid tank and also after leaving the solder bath, substantially as herein described.

25. In a can body making machine, a reciprocating horn extending through the cans and having the upper portion cut away above the acid tank and solder bath, carriers by which the can bodies are advanced by a forward movement of the horn and a bar fitting a longitudinal channel in the horn and having projections which engage and hold the cans when the horn is retracted, and by which the cans are tilted as they enter and leave the acid tank and solder bath, substantially as herein described.

In witness whereof I have hereunto set my hand.

CLARENCE M. SYMONDS.

Witnesses:
S. H. NOURSE,
H. F. ASCHECK.